United States Patent
Galvin et al.

(10) Patent No.: US 6,351,464 B1
(45) Date of Patent: *Feb. 26, 2002

(54) VIRTUAL SECOND LINE HYBRID NETWORK COMMUNICATION SYSTEM

(75) Inventors: Tom J. Galvin, Hiawatha; Joel K. Hanson, Anamosa; Mike C. Kirchner, Cedar Rapids; Tony W. S. Moey, Coralville; Mark J. O'Brien, Hiawatha, all of IA (US)

(73) Assignee: MCI WorldCom, Inc., Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/399,601

(22) Filed: Sep. 20, 1999

(51) Int. Cl.⁷ .............................................. H04L 12/66
(52) U.S. Cl. .................. 370/356; 370/401; 379/900
(58) Field of Search ......................... 370/352, 353–357, 370/401; 379/900

(56) References Cited

U.S. PATENT DOCUMENTS

| | | | |
|---|---|---|---|
| 5,805,587 A | | 9/1998 | Norris et al. |
| 5,910,982 A | * | 6/1999 | Shafer et al. ............... 379/220 |
| 6,075,783 A | * | 6/2000 | Voit ........................... 370/352 |
| 6,157,648 A | * | 12/2000 | Voit et al. ................... 370/401 |
| 6,161,008 A | * | 12/2000 | Lee et al. ................... 455/414 |

* cited by examiner

Primary Examiner—Hassan Kizou
Assistant Examiner—Ahmed Elallam

(57) ABSTRACT

A system and method for routing a telephone call on a PSTN network to a data device. The present invention utilizes an automatic call processing system that has a one number location service. A called party provides a calling profile that is stored in the automatic call processing (ACP) system. When a call is placed to a telephone number that is assigned to the called party, the call is routed to the ACP system. The ACP system calls each of the numbers of the calling profile for that called party until that party is reached. At least one of the destinations in the calling profile is a logical address for a data network. The automatic call processing system recognizes the logical address and queries a directory to determine if an IP address has been registered in the directory for the logical address of the called party. If the called party is using a data device that is logged on the Internet, an IP telephony agent, such as an IP telephony client running on the data device, registers the IP address of the data device together with the logical address of the caller. If the ACP system determines if an IP address is registered with the directory, the ACP system will direct the call to an Internet telephony gateway. The Internet telephony gateway encodes and packetizes the voice information for transmission over the data network to the data device.

17 Claims, 3 Drawing Sheets

US 6,351,464 B1

VIRTUAL SECOND LINE HYBRID NETWORK COMMUNICATION SYSTEM

BACKGROUND OF THE INVENTION

A. Field of the Invention

The present invention pertains generally hybrid networks and more specifically voice communications over hybrid networks.

B. Description of the Background

Various forms of communication through the PSTN network have greatly increased the demand for PSTN numbers and dedicated PSTN lines. For example, the proliferation of cell phones has greatly increased the demand for PSTN numbers. Dial-up access to the Internet, as well as the ubiquitous use of fax machines has resulted in a demand for dedicated PSTN lines for those services in addition to normal voice PSTN lines. For example, a single individual may have an office line, a home business line, a dedicated line at home for fax and dial-up modem access to Internet service providers (ISP) and a separate home telephone line. In addition, that individual may also have a car phone and a cell phone. Calling parties may be unwilling to call these plurality numbers in an attempt to contact an individual.

Also, the use of PSTN services can be expensive. For example, long distance charges, monthly charges for multiple dedicated lines and similar charges can be as much as several hundred dollars a month for an individual, and even more for businesses.

To overcome these problems, various products have been developed such as the "CONTACT" product provided by MCI Worldcom that is a one number location service. The CONTACT product uses a single number that is assigned to each subscriber. A calling party dials the number that is assigned to a called subscriber to access a calling profile for that subscriber. An automatic call processing system then calls each of the numbers in the stored calling profile sequence of numbers for that subscriber in an effort to contact the subscriber. In this manner, a single number can be used to access the subscriber, thereby eliminating many of the frustrations associated with attempting to contact an individual that has a plurality of PSTN numbers. Although the one number access products are effective in locating a user at various PSTN lines, to date, such services have not been able to connect a user to a data device on a data network, such as the Internet to provide IP telephony calls.

As an alternative to PSTN calls, IP telephony has become a popular and inexpensive manner of providing voice communications between users that are connected to the Internet. Some of the advantages of IP telephony are that it allows for widespread voice communication in an inexpensive manner. Increasing bandwidth on the Internet as a result of newer, high speed servers and a better infrastructure of fiber optic cable connections has allowed IP telephony connections to produce high clarity calls that in many cases are indistinguishable from normal PSTN connections. IP Telephony may also have the beneficial advantage of decreasing the current demand for PSTN numbers for the various types of PSTN communications that currently exist.

Further, in an effort to provide an alternative to having a dedicated line for dial-up services to ISPs, local exchange carriers (LECs) have offered a service called Internet Call Waiting. Internet Call Waiting products operate by detecting when a particular PSTN line is busy. The LEC then forwards the call to the subscriber's ISP. The subscriber's ISP recognizes the dialed number of the subscriber using dialed number identification service (DNIS), determines that the subscriber is logged on and generates a message that is sent to the called party that a PSTN call is being received. The subscriber may then quickly log off and answer the PSTN call. The Internet Call Waiting products provide a convenient way to share the resources of a single line and eliminate the proliferation of multiple PSTN lines.

There are many limitations, however, of the Internet Call Waiting systems. For example, many LECs do not provide such service. Such service requires LEC forwarding which many LECs have not yet provided to customers. Further, most Internet Call Waiting services require the user to be subscribed to services from a specific ISP. The user may not wish to subscribe to services from that particular ISP. Further, Internet Call Waiting only works on the line to which that service is subscribed. In other words, the Internet Call Waiting services do not allow the user to log on using a different PST line.

Considering the advantages of these disparate products, it would be advantageous to have a one number location service that is capable of contacting an individual at one of several destinations that includes an IP logical address and that will connect a call to the IP physical address at which the called party is located. In other words, it would be advantageous to provide a service that would allow completion of calls from a PSTN line to a data device connected to a data network and that would allow the data device to be connected to the data network at any desired location utilizing a one number location service.

SUMMARY OF THE INVENTION

The present invention overcomes the disadvantages and limitations of the prior art by providing such a service. The present invention utilizes a single number location service that is also capable of connecting a PSTN call to a data device at a network destination that is at least one of the destinations in the called party's profile. Unlike Internet Call Waiting services, a user can be connected to the data network at any desired location. The present invention uses a logical address that is stored in a directory together with the physical address of the location where the user is connected to the system. A caller can then call a single PSTN number assigned to a user which is routed to an automatic call processing system. The automatic call processing system accesses a calling profile for the called number and sequentially calls each of the numbers in the call profile. The call profile may include one or more logical addresses (IP alias). The automatic call processing system recognizes the IP alias as a destination on the data network and queries the directory to determine if the data device is logged on to the IP network and to obtain the physical IP address of the data device on the network. If the data device has registered an IP address, that indicates that the device is logged on to the system and that the PSTN call can be routed to a translator for subsequent routing to the data device on the data network.

The present invention may therefore comprise a method of communicating a voice call from a caller on a PSTN network to a called party on a data device that is connected to a data network at an address on the data network that may change each time the data device is connected to said data network comprising the steps of registering the address of the data device with a directory, routing a call from the caller on the PSTN network to a sequence of destinations that are assigned to the called party such that at least one of the destinations in the sequence is a destination on the data network, determining the address of the data device on the data network, routing the call from the PSTN network through a translator to the address on the data network whenever the data device has registered the address with the directory and the call is routed to the destination on the data network.

The present invention may further comprise of a system for placing a call from a calling party to a called party over a hybrid PSTN/data network comprising, a telephone connected to the PSTN network that originates a call from the calling party over the PSTN network, a data device that is connected to the data network, a directory connected to the data network that registers an address on the data network for the data device whenever the data device is connected to the data network, an automatic call processing system that receives the call and sequentially routes the call in accordance with a calling profile having a plurality of destinations of which at least one destination is a destination on the data network, a translation device connected to both the PSTN network and the data network that queries the directory to determine if the data device has registered an address on the data network and to route the call over the data network to the address whenever the data device has a registered address on the data network.

The advantages of the present invention are that a seamless connection can be made to complete an IP telephony call to a data device on a data network from a PSTN number using a single number locator service. The present invention has all the advantages of the single number location services, but in addition, also allows for IP telephony calls to be completed to data devices in a seamless manner. In this fashion, the PSTN network can act as a front end connection to the vast Internet data network. The use of a single number assigned to an individual will allow the front end PSTN network to interface and locate an individual at any physical IP address at which the user is connected. Heretofore, a simple and convenient system for interfacing the PSTN network using a single PSTN number for connection to an individual on an IP network has not been available.

Individual LEC lines are not required for each data device utilizing the principles of the present invention. Data devices no longer are required to have a static location (IP address) via a dedicated PSTN line. Management of dedicated LEC lines for each data device is cumbersome and is very costly. The single number location service coupled with a directory for locating a user that may have numerous data devices on which a single logical address is used greatly reduces the cost and inconvenience of using a dedicated LEC line for each data device.

The present invention also provides other advantages. Data devices such as personal data assistants (PDAs) may constantly be connecting and reconnecting to an IP network at different locations since the PDAs are portable devices that may be connected to ISPs or local networks through wireless connections such as RF, IR, etc. Each connection and reconnection of the PDA will result in a different physical IP address associated with the logical address for that PDA. The directory (gatekeeper) of the present invention stores the IP address with the logical address of the data device to provide the physical location and log on status of the data device.

Also, since calls that are directed to a logical IP address (IP alias) in a called party's calling profile are routed directly to a translator (IP/telephony gateway), switching functions are not provided by the LEC at the called party's end. Hence, connection charges by the local LEC of the called party are eliminated.

Further, the only PSTN charges associated with the call are the LEC charges at the calling party end which result from connection of the calling party to the automatic call processing system. Hence, long distance calls to any dynamic location at which the user is connected to the data network can be made inexpensively as an IP telephony call.

Additionally, the varying grades of service and other limitations of a local LEC at the called party's location are avoided.

Further, the proliferation of PSTN numbers is reduced since a single number access service is provided together with connection of a call to a data device. Also, IP telephony clients that are currently available allow a user to conduct both the IP telephony call and remain logged on to the Internet simultaneously since the data packets for the voice data are routed to the IP telephony client while the data packets for the data device are routed to the IP browser. Unlike Internet Call Waiting, the data device user can then operate the data device and simultaneously conduct an IP telephony call.

DETAILED DESCRIPTION OF THE
PREFERRED EMBODIMENT OF THE
INVENTION

Figure 1:
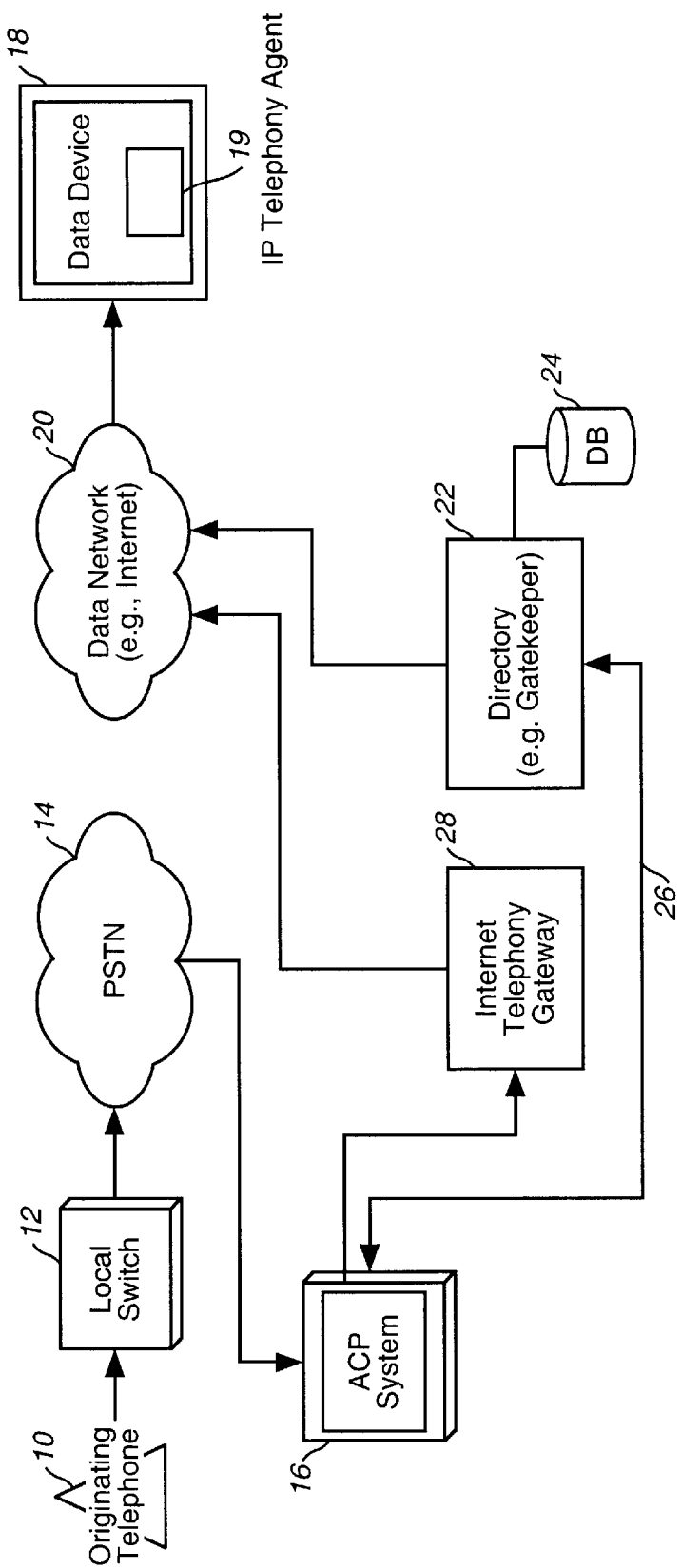
FIG. 1 is a schematic block diagram of the present invention.

FIG. 1 is a schematic block diagram illustrating the connection of the primary components of the present invention. As shown in FIG. 1, an originating telephone 10 is connected to a local switch 12 which is, in turn, connected to the public switch telephone network 14, in the common manner in which telephone service is provided. The originating telephone can comprise a standard telephone that is hard-wire connected to the LEC local switch 12, or it can comprise any type of telephone device that has a wireless connection to the PSTN 14, including cell phones, phones connected through satellites and various other types of connections. The number dialed by the calling party at the originating telephone is a telephone number assigned to the called party. The PSTN 14 routes the call to an automatic call processing system 16 which is the destination for that particular dialed PSTN telephone number. The automatic call processing (ACP) system 16 employs a single number location service mentioned above and described more fully with respect to FIG. 3 herein. Briefly, a called party has a ten digit telephone number that is assigned to that called party. A calling party that desires to reach the called party dials that ten digit number. The PSTN 14 routes that call to ACP system 16. The ACP system 16 checks the called party's stored calling profile and sequentially dials a sequence of telephone numbers listed in the calling profile for the called party until the called party is reached. In accordance with the present invention, at least one of the destination numbers in the profile is a logical address for a data network such as the Internet. Typically a logical address will constitute an e-mail address for that individual. Of course, any unique logical address, which is referred to herein as an IP alias, can be used to identify the called party.

Meanwhile, the called party has decided to use data device 18 to connect to data network 20. For example, the called party uses a computer to log on to the Internet. This may occur through dial up service to an ISP or connection through a local network to an ISP. Data device 18 can comprise any type of data device including a personal data assistant that uses a wireless connection to the data network 20. Wireless connections to data networks such as IP networks of various sorts using any desired type of data device including computers, PDAs, etc. are becoming more prevalent. If the called party is traveling, or otherwise moving from one location to another, the data device 18 may be connecting and reconnecting to the data network 20 from a series of sequentially different locations. In such a case, the actual physical address (IP address) of the data device will sequentially change. Data device 18 uses a telephony agent that is compatible with the data network such as an IP telephony client. Any desirable type of IP telephony agent can be used including hardware or software agents that exist separately or may comprise a portion of an existing hardware or software operating system for a data device. Currently available IP telephony clients include Microsoft "Net Meeting" and Net Speak "Web Phone." These and other similar programs are commercially available programs. These computer programs are specifically designed to send and receive IP telephony calls. In a receive mode, they are capable of identifying data packets that are addressed as IP telephony data packets. The IP telephony clients receive these data packets and decode them to generate voice information. Similarly, voice information is encoded by the IP telephony client and transmitted as data packets to the data network 20.

The IP telephony agent 19 that is running on the data device 18 is also configured to automatically access the directory 22 that is connected to the data network 20. The IP telephony agent 19 transmits information to the directory 22 that indicates the IP alias and IP address of the data device 18. This occurs when the data device 18 first connects or reconnects to the data network 20. Again, different IP addresses for the called party may be sequentially registered with directory 22 as a result of the called party logging on to the data network at different locations or with different data devices.

The directory 22, that is illustrated in FIG. 1, utilizes a data base 24 that stores the logical address and associated physical address of the data device 18. For example, the IP alias is stored in conjunction with the IP address of the data device 18. This registration process provides an indication of the physical location of the data device for the corresponding IP alias of the user, as well as an indication that the data device 18 is actually connected to data network 20. If the data device 18 is not registered with the directory 22, it can be assumed that the data device 18 is not connected to the data network 20.

Referring again to the ACP system 16 of FIG. 1, whenever the ACP system 16 identifies a destination number in a sequence of numbers of the calling profile of the called party as an IP alias, the ACP system 16 queries the directory via line 26 to determine if the user is registered with the directory 22. Directory 22 checks the data base 24 to determine if an IP address is stored for the IP alias of the called party. If an IP alias is stored in the data base 24 for the IP alias, the directory 22 sends that IP address to the ACP system 16. The IP address received by the ACP system 16 identifies the physical location of the data device 18 being used by the called party and indicates that the called party is logged on to the data network 20. If no IP address is stored in data base 24 for that particular IP alias, directory 22 sends a message to ACP system 16 indicating that no IP address currently exists for that IP alias. The ACP system 16 then moves on to the next number in the sequence of numbers in the called party's profile.

Whenever the ACP system 16 receives an IP address for a data device 18 that indicates that the called party is logged on to data network 20, ACP system 16 routes the call to an Internet/telephony gateway 28. The Internet/telephony gateway 28 encodes the voice call into data packets that are transmitted to data network 20. For example, standard Codec technology is used by gateway 28 to encode the voice call into IP data packets that are transmitted through the Internet. Gateway 28 can comprise any standard commercially available gateway that may include encoder/decoders, a server and DSP resources. Gateways are available from major suppliers of data network equipment such as Lucent, Cisco and 3-Com. The Internet then forwards these data packets to the IP address of the data device 18 to complete the transmission of the call to the called party. The IP telephony agent 19 decodes these data packets and provides voice information to the called party via speakers located in the data device 18.

As disclosed above, FIG. 1 shows the manner in which an originating telephone can transmit a call to a data device 18. Outbound transmission of voice information from data device 18 to the telephone 10 can be performed in the standard fashion in which IP telephony calls are currently made.

Figure 2:
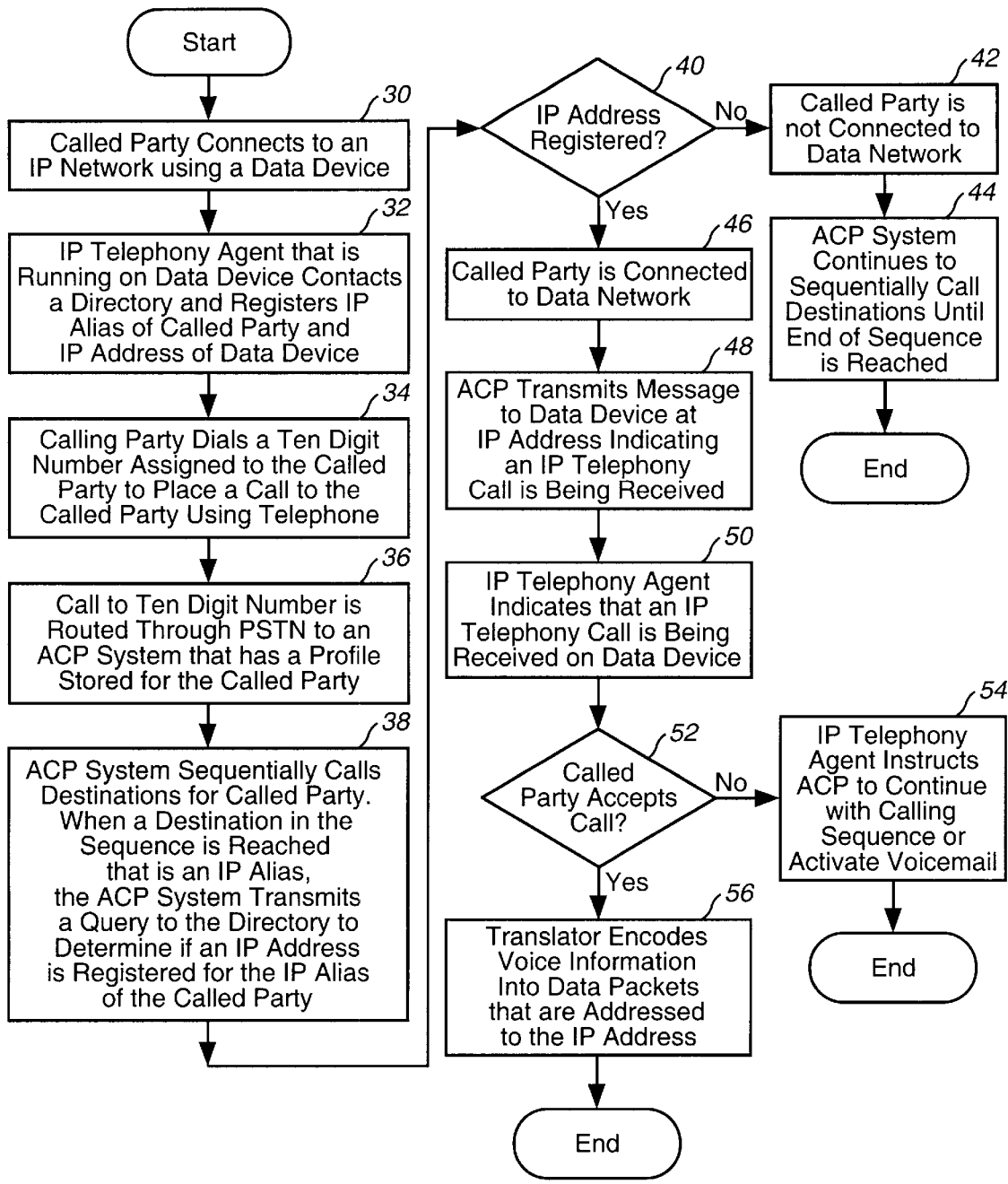
FIG. 2 is a call flow diagram of the present invention.

FIG. 2 is a flow diagram illustrating the call sequence of the present invention. At step 30, the called party connects to an IP network 20 using a data device 18. At step 32, an IP telephony agent 19, that is running on the data device 18, contacts a directory and registers the IP alias of the called party and the IP address of the data device 18. At step 34 the calling party dials a ten digit number that is assigned to the called party to place a call to the called party using telephone 10. At step 36, the call is routed through the local switch 12 and PSTN 14 to an automatic call processing (ACP) system 16 that has a stored profile for the called party. At step 38, the ACP system sequentially calls each of the destinations for the called party that are stored as the calling profile in the ACP system. When a destination in the sequence is reached that is an IP alias, the ACP system 16 transmits a query to directory 22 to determine if an IP address is registered for the IP alias of the called party. At decision step 40, a determination is made by the directory 22 if an IP address is registered for the IP alias of the called party. If no IP address is registered, at step 42 the called party is presumed to not be connected to the data network 20. At step 44, the ACP system continues to sequentially call destinations in the calling profile until the end of the sequence is reached. If it is determined at step 40, by directory 22, that an IP address is registered with the directory, it is established that the called party is connected to the data network 20. At step 48, the ACP transmits a message to the data device 18 at the IP address of the data device 18 indicating that an IP telephony call is currently being received. At step 50, the IP telephony agent 19 indicates that an IP telephony call is being received on the data device 18. At decision step 52, the called party decides whether to accept the call. If the called party decides not to accept the call, at step 54 the IP telephony agent 19 instructs the ACP system to continue with the calling sequence or direct the call to voice mail. At step 52 if the called party does accept the call, a translator encodes the voice information into data packets that are addressed to the IP address of the called party at step 56.

Figure 3:
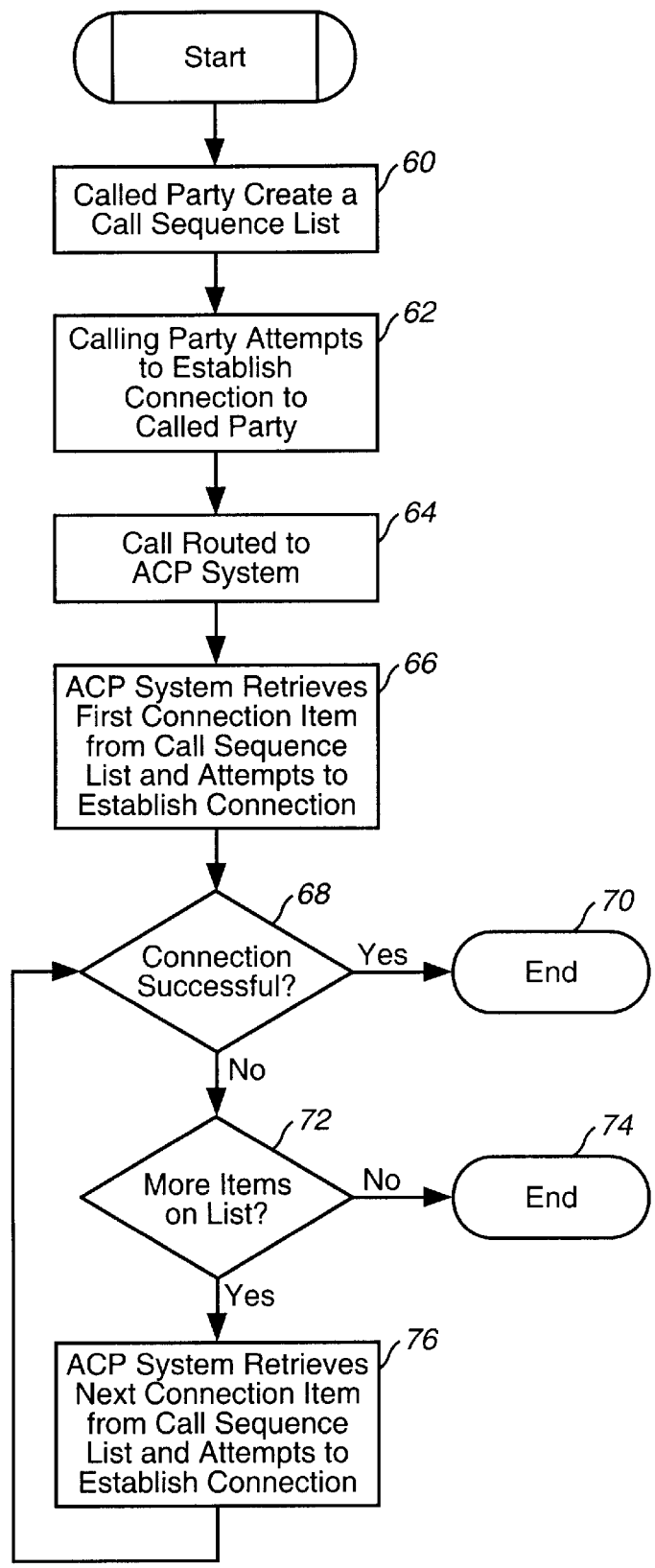
FIG. 3 is a flow diagram illustrating the operation of the single number access system utilized in accordance with the present invention.

FIG. 3 is a schematic flow diagram of the call sequence for a typical one number location service. An exemplary one number location service is disclosed in application Ser. No. 08/751,661 filed Nov. 18, 1996 entitled SYSTEM, METHOD AND ARTICLE OF MANUFACTURE FOR FIND ME, FOLLOW ME PROCESSING USING A HYBRID NETWORK, and U.S. application Ser. No. 09/364,536 filed Jul. 29, 1999 entitled METHOD OF AND SYSTEM FOR EXTENDING INTERNET TELEPHONY OVER VIRTUAL PRIVATE NETWORK DIRECT ACCESS LINES. These applications are specifically incorporated herein by reference for all that they disclose and teach.

As shown in step 60 of FIG. 3, a called party creates a call sequence list. This may be done through Internet connection to an ACP system, such as ACP system 16. The call sequence list (calling profile) may be laid out in a matrix that indicates each day of the week and specific times during each day. Phone numbers can be entered for each of these periods, for each day of the week, to create a prioritized list of telephone numbers at which a subscriber can be reached. In accordance with the present invention, such a list may include one or more IP aliases such as e-mail addresses. At step 62, a calling party attempts to establish a connection to the called party by dialing a ten digit telephone number that is assigned to the called party. At step 64, the call is routed to an ACP system such as ACP system 16. At step 66, the ACP system 16 retrieves the first destination item from the call sequence list and attempts to establish a connection to that destination. At step 68, the ACP system 16 determines if the connection is successful. If the connection is successful, the process ends at step 70. If the connection is not successful, a decision is made at step 72 by the ACP system if additional destinations are provided on the calling profile. If there are not any additional destinations, the process ends at step 74. If there are additional destinations, the ACP system retrieves the next destination item from the call sequence list and attempts to establish a connection at step 76. The process then continues with decision step 68.

The present invention therefore provides a unique manner of interfacing PSTN calls to data networks such as the Internet. The use of a one number location service that includes IP logical addresses allows a calling party to be seamlessly connected to the called party using IP telephony. In many instances, the seamless connection will not even be apparent to the calling party because of the clarity that is capable of being achieved in IP telephony calls. Since a directory is used that allows for dynamic registration of IP addresses that correspond to logical addresses on the data network, the called party can be located at virtually any location and still be able to receive such a call in a seamless manner. Local LEC connection charges can be avoided, and long distance IP telephony calls can be completed in an inexpensive and convenient manner utilizing the present invention. Since the present invention is not dependent on local LEC services, limitations of local LECs do not affect the present invention.

The foregoing description of the invention has been presented for purposes of illustration and description. It is not intended to be exhaustive or to limit the invention to the precise form disclosed, and other modifications may be possible in light of the above teachings. For example, the present invention, in its broadest sense, provides a way to interface the PSTN network using dialed telephone numbers with any data network, including the Internet. Using a one number location service, a super directory can be formed in accordance with the present invention for locating individuals. An individual may be assigned a specific number that does not change, such as a social security number. In this fashion, the PSTN network can be used to locate an individual at any location, at any time, and on any type of data device that is being used by the individual.

Of course, the embodiment that has been disclosed was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method communicating a voice call from a caller on a PSTN network to a called party utilizing a data device that is connected to a data network at an IP address indicating a location of said data device on said data network comprising the steps of:

registering said data device with a gatekeeper that stores said IP address in association with an alias assigned to said called party while said data device is connected to said data network;

dialing a PSTN number that is assigned to said called party;

routing said voice call to a sequence of destinations assigned to said called party such that at least one of said destinations in said sequence corresponds to said alias;

connecting said voice call to a gateway that transmits said voice call over said data network to said called party on said data device at said IP address; and registering said data device with the gatekeeper, the gatekeeper storing a second IP address in association with the alias, the second IP address indicating a second location of the data device on said data network, wherein the gatekeeper stores only one IP address in association with the alias at any given time.

2. The method of claim 1 further comprising the step of:
querying said gatekeeper whenever one of the sequence of destinations corresponds to said alias to determine if said data device is connected to said data network.

3. The method of claim 1 wherein said step of registering said data device comprises registering a personal data assistant data device.

4. The method of claim 1 wherein said step of registering said data device comprises registering a data device that is wirelessly connected to said data network.

5. The method of claim 1 wherein said step of registering said data device further comprises:

using an IP telephony agent to automatically register said data device with said gatekeeper.

6. A system for placing a call from a calling party to a called party over a hybrid PSTN/data network comprising:

a telephone connected to said PSTN network that originates a call from said calling party over said PSTN network;

a data device that is connected to said data network;

a directory connected to said data network that registers an address on said data network in association with a network alias, the network address corresponding to a location of said data device on said data network;

an automatic call processing system that receives said call and sequentially routes said call in accordance with a calling profile having a plurality of destinations of which at least one destination of said plurality of destinations is the network alias; and a translation device connected to both said PSTN network and said data network that queries said directory to determine if said data device has registered an address on said data network and to route said call over said data network to said address whenever said data device has a registered address on said data network, wherein said directory registers a second address on said data network in association with the network alias, the second address corresponding to a second location of said data device on said data network, and wherein the directory registers only one address of said data device in association with the network alias at any given time.

7. The system of claim 6 further comprising an agent operative on said data device that registers said data device with said directory.

8. The system of claim 7 wherein said agent is an IP telephony agent.

9. The system of claim 6 wherein said directory is a gatekeeper that is locally connected to said translation device.

10. The system of claim 6 wherein said data network is an IP network.

11. The system of claim 10 wherein said IP network is the Internet.

12. The system of claim 6 wherein said translation device is an IP/telephony gateway.

13. The system of claim 6 wherein said data device is a personal data assistant.

14. The system of claim 6 wherein said data device is a personal data assistant having a wireless connection to said data network.

15. The system of claim 6 wherein said telephone comprises a wireless communication device that is connected to said PSTN network.

16. A method of communicating a voice call from a caller on a PSTN network to a called party utilizing a data device that is connected to a data network at an address on said data network that may change each time said data device is connected to said data network, the method comprising the steps of:

registering said address of said data device with a directory in association with an alias;

routing a call from said caller on said PSTN network to a sequence of destinations that are assigned to said called party such that at least one of said destinations in said sequence is said alias;

determining said address of said data device on said data network;

routing said call from said PSTN network through a translator to said address on said data network whenever said data device has registered said address with said directory and said call is routed to said alias; and registering a second address of said data device with the directory in association with said alias, wherein only one address of said data device is registered with the directory in association with the alias at any given time.

17. A method for placing a call from a calling party on a telephone on a PSTN network to a called party on a data device on a data network, said called party having a unique alias, comprising the steps of:

registering said data device in association with said alias in a directory that indicates whether said called party is logged-on to said data device and provides an address of said data device on said data network;

storing a destination profile for said called party using said alias in an automatic call processing system;

sequentially routing said call to a series of destinations in accordance with said destination profile;

accessing said directory to determine said log-on status of said called party and said address of said data device whenever a destination in said destination profile corresponds to said alias;

routing said call to said address if said called party is logged on to said data network;

translating said call to a data telephony call; and registering said data device in association with said alias in the directory, indicating whether said called party is logged-on to said data device and providing a second address of said data device on said data network, wherein the directory provides only one address of said data device at any given time.

* * * * *